E. M. Scott,

Grinding Morring-Machine Knives.

No. 3,159. Reissued Oct. 13, 1868.

Witnesses.
Jno. D. Allen
J. Morris Pool

Inventor.
Henry Richardson
By atty. A. B. Stoughton

N. PETERS, PHOTO-LITHOGRAPHER, WASHINGTON, D. C.

United States Patent Office.

HENRY RICHARDSON, OF NEW YORK, ASSIGNEE, BY MESNE ASSIGNMENTS, OF EDWIN M. SCOTT, OF AUBURN, NEW YORK.

*Letters Patent No.* 67,355, *dated July* 30, 1867; *reissue No.* 3,159, *dated October* 13, 1868.

IMPROVEMENT IN MACHINE FOR GRINDING THE CUTTERS OF MOWING-MACHINES.

The Schedule referred to in these Letters Patent and making part of the same.

*To all whom it may concern:*

Be it known that EDWIN M. SCOTT, of Auburn, in the county of Cayuga, and State of New York, has invented certain new and useful Improvements in Machines for Grinding Reaper-Knives; and that the following is a full, clear, and exact description of the same, reference being had to the accompanying drawings, making a part of this specification, in which—

Similar letters of reference, where they occur in the separate figures, denote like parts of the machine in all of the drawings.

Figure 1:
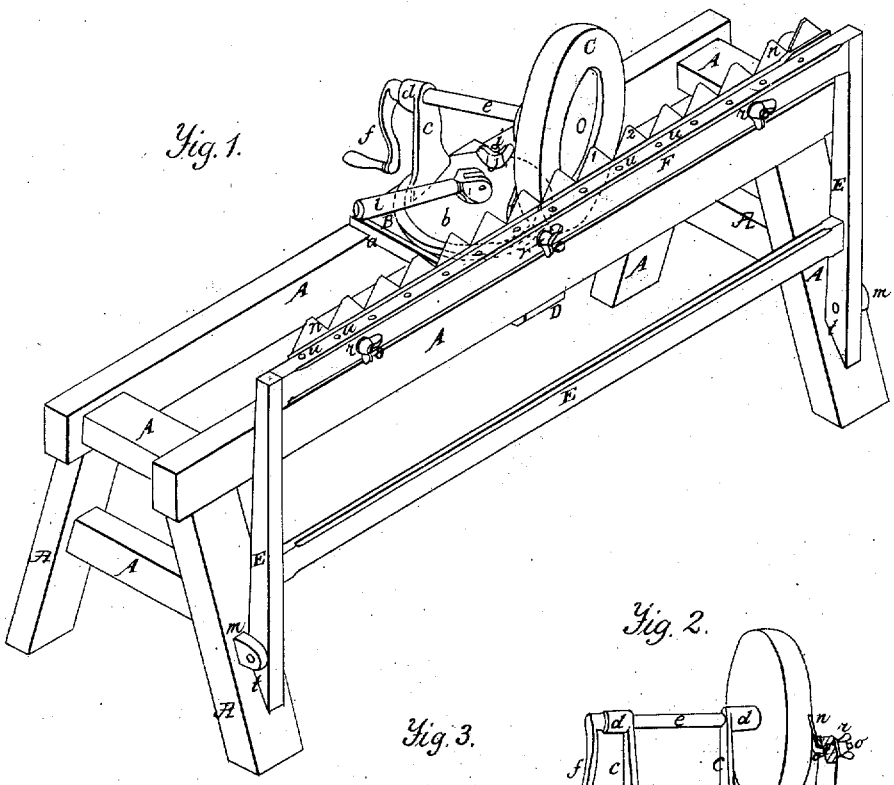
Figure 1 represents a perspective view of the machine.

Reaper-knives, though in their serrated form resembling a saw, cut entirely different from a saw, and therefore must be differently ground, and when done by or in machines, such machines must be differently constructed, each for its special purpose. The cutting-part of a saw-tooth is the point of the tooth, whilst the cutting-part of a reaper-knife is the bevelled or inclined edges of the teeth or sections, a point not being at all necessary, and most generally not used, that portion being left square or blunt. And whilst, in a saw, the forming or grinding of the gullet or throat is not necessarily exact or uniform, as it performs no part of the cutting-operation, in a reaper-knife it is not only important but essential, as the serrated or indented edges, clear down to their point of connection, must be accurately ground as to inclination, and also as to the bevel of the cutting-edges.

The object of this invention was to provide a machine simple enough in its character to be used by any one at all familiar with the working of a harvesting-machine, and that might be portable in its character, and above all, that it might be used in grinding the cutting-edges at such inclinatian and bevel as is required in cutting grain or grass, and particularly in carrying the bevel clear down into the corners of the adjacent teeth or sections.

And the nature of the invention consists, first, in the use of a vertically, or nearly so, swinging clamping-frame, for holding and moving the reaper-knife to and from the revolving grinding-wheel or stone, so that the operation of grinding, and the inspection of the surfaces ground, may be always under the immediate observation of the operator.

And the invention further consists in giving the clamping-bar in the swinging frame an inclination, with regard to said frame, or its centre of swinging motion, as will admit of the knife being so presented to the grinding-wheel or stone as to be ground clear down into the corners where the cutting-edges meet, and with the proper inclination and bevel.

And the invention further consists in holding the reaper-knife to the inclined bar, by means of clamp-hooks that will not interfere with the moving of the stone in its traverse along the knife, or the knife with the stone.

And the invention further consists in the combination of the disk, slides, and thumb-screw, for setting the stone at the properly-inclined position, and moving it in that adjusted position from section to section of the knife.

And the invention further consists in the combination of the disk, slides, lever, and its connection therewith, for holding or releasing the slides, to allow the grindstone to be moved to and then held in its proper grinding-position.

To enable others skilled in the art to make and use the invention, I will proceed to describe the same with reference to the drawings.

A represents a bench or frame, the top longitudinal timbers or pieces of which form parallel ways for the slide B to be moved upon or clamped to, as may be required, said slide being shouldered or recessed at *a a*, so as to move truly on the ways.

On the slide B there is placed a plate or disk, *b*, on which there are two pillar-blocks or supports, *c c*, with bearings, *d d*, thereon, for the shaft *e*, that carries the grinding-wheel or stone C upon one of its extreme ends to turn in, the end of said shaft being furnished with a crank, *f*, by which it may be turned.

Figure 4:
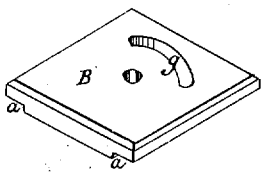
Figure 4 represents the slide-rest that supports the stone, and on or to which it is clamped at any suitable angle, and by which it is moved up to the sections that are to be ground with uniformity of inclination.

The slide B has a circular slot, *g*, fig. 4, formed in it, through which a clamping-bolt, *i*, (with a head, *h*, underneath the slide,) passes, its upper end, above the plate *b*, being furnished with a thumb-nut, *j*, so that the plate *b*, and the grindstone on it, may be set to any desired angle with regard to the slide B or its traversing-ways, and then clamped in that adjusted position to the slide. Underneath the ways there is another shouldered slide, D, which is held up to the ways by a bolt, *k*, passing through it, through the slide B, and through the plate *b*, and by means of a lever, *l*, and a cam or cams on the plate, the slides, plate, and the grindstone may be clamped to the frame or ways, or released, to be moved thereon, whilst the grindstone may maintain its inclination or adjustment by its being clamped to the slide B.

The stone has two adjustments, viz, one on the slide B, and the other with both of the slides, and thus it may be set at the desired angle with regard to the traversing-ways, and then moved on the ways, maintaining that angle.

Figure 2:
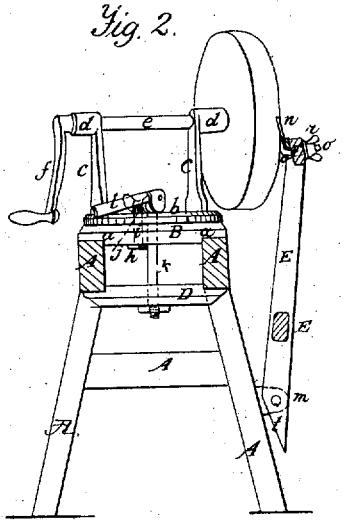
Figure 2 represents a vertical cross-section through the same.
Figure 3:
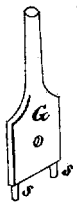
Figure 3 represents a forked lever, for bearing the knife against the grindstone, and working the swing-frame.

To lugs, *m m*, on the bench or frame A, there is pivoted the swinging frame E, the top or clamping-bar F of which is inclined with regard to the frame or its centre of motion, as more distinctly shown in fig. 2. Without this inclination of the clamping-bar F, the knife could not be brought up to the stone so as to grind down in the corners, or to maintain a uniform bevel to the cutting-edges from top to bottom.

An inspection of the drawing, (fig. 4,) will clearly show that the inclination of the bar F, which gives the inclination necessary to the knife *n*, is indispensable, for if the bar F had the same inclination, or were in the same plane with the arms or frame E, the knife could not be brought up to the stone along its whole cutting-edge.

The point of the section next adjacent to the section that is being ground must go beyond the edge of the stone, (the grinding being done by the face and not by its edge,) so that the one being ground can come up along its whole edge to the grinding-surface. As, for instance, in fig. 1, the edge of the section marked 1 is being ground by the face of the stone; and that it may be ground with the proper inclination and bevel, the section next adjacent thereto, marked 2, (but more clearly shown in fig. 2,) must go beyond the face of the stone, to admit of the one being ground to come up to the stone. Without this inclination of the knife, which it gets from the clamping-bar F, the grinding to angle and bevel could not be done, the stone being adjusted to the angle, whilst the inclination of the bar or knife regulates the bevel to the cutting-edge, both being necessary to form a good knife.

The knife is held to the bar by hook-headed clamps, *o o o*, in which the back of the knife is set, and by thumb-nuts, *r*, on the outer side of the bar F, it is firmly and securely held thereto, the heads or hooks of these clamps being so made as to allow the stone or the knife to be moved without interfering with the operation of grinding.

The operator standing by the bar, and near where the grinding is being done, may, with a lever, G, the points *s s* of which may enter any of the series of holes *u u* in the bar, gently bear the knife against the stone. And that he may observe from time to time the progress of the grinding, the frame and knife may be swung away, and stop and be held by its inclined ends, *t t*, coming against the frame or legs A thereof, whilst the operator examines the work, and properly provides for doing it correctly.

The clamping-frame needs but slight motion to carry the knife to the stone, or to bring it back where the operator can inspect it, the frame standing itself in the latter position.

Of course one of the elements of the operation requires the stone or the knife to be moved one to the other.

In this machine the stone is moved, and the operator moves or stands where the grinding is going on.

Having thus fully described the nature, object, and purpose of this invention,

What is claimed therein as new, and desired to be secured as the invention of EDWIN M. SCOTT, is—

1. In combination with a revolving grinding-wheel or stone, on the end of a shaft, the vertically, or nearly so, swinging frame, for holding the reaper-knife to be ground, so that it may be swung up to the stone, or back, to be examined by the operator, substantially as described.

2. In combination with the swing-frame, the inclining of the clamping-bar, so that the sections or edges to be ground may be brought in their entire length to the grinding-surface of the stone, substantially as described.

3. The combination of the disk, slides, and thumb-screw, as and for the purpose set forth.

4. The combination of the disk, slides, bolt, and lever, substantially as and for the purpose described and represented.

HENRY RICHARDSON.

Witnesses:

HORACE T. COOK,

BRADLEY A. TUTTLE.